United States Patent
Vaughan et al.

(10) Patent No.: US 9,264,111 B2
(45) Date of Patent: Feb. 16, 2016

(54) REASSIGNMENT OF DATA AMONG SUBCARRIERS IN WIRELESS DATA COMMUNICATION

(75) Inventors: Rodney G. Vaughan, Burnaby (CA); D. Andrew G. Lea, Vancouver (CA); Ronald J. Vanderhelm, Surrey (CA)

(73) Assignee: Simon Fraser University, Burnaby, CA (US)

( * ) Notice: Subject to any disclaimer, the term of this patent is extended or adjusted under 35 U.S.C. 154(b) by 212 days.

(21) Appl. No.: 12/898,306

(22) Filed: Oct. 5, 2010

(65) Prior Publication Data

US 2011/0116569 A1    May 19, 2011

Related U.S. Application Data (60) Provisional application No. 61/248,623, filed on Oct. 5, 2009.

(51) Int. Cl.
| | |
|---|---|
| *H04L 27/00* | (2006.01) |
| *H04B 7/04* | (2006.01) |
| *H04B 1/04* | (2006.01) |
| *H04L 27/26* | (2006.01) |
| *H04W 72/08* | (2009.01) |

(52) U.S. Cl.
CPC ............... *H04B 7/04* (2013.01); *H04B 1/0483* (2013.01); *H04L 27/2601* (2013.01); *H04W 72/082* (2013.01)

(58) Field of Classification Search
USPC .......................................... 375/299, 295, 316
See application file for complete search history.

(56) References Cited

U.S. PATENT DOCUMENTS

| | | | |
|---|---|---|---|
| 6,922,549 B2 | 7/2005 | Lyons et al. | |
| 7,257,425 B2 | 8/2007 | Wang et al. | |
| 7,904,117 B2 * | 3/2011 | Doan et al. | 455/562.1 |
| 2007/0021085 A1 * | 1/2007 | Kroeger | 455/272 |
| 2007/0101015 A1 * | 5/2007 | Larsson et al. | 709/238 |
| 2008/0056220 A1 * | 3/2008 | Yu et al. | 370/342 |
| 2008/0112308 A1 * | 5/2008 | Cleveland | 370/204 |
| 2008/0112359 A1 * | 5/2008 | Cleveland et al. | 370/329 |
| 2008/0186938 A1 * | 8/2008 | Okazaki | 370/343 |
| 2008/0316985 A1 * | 12/2008 | Kostic et al. | 370/338 |
| 2009/0092075 A1 * | 4/2009 | Corson et al. | 370/328 |
| 2009/0238151 A1 * | 9/2009 | Ramesh et al. | 370/335 |
| 2010/0062705 A1 * | 3/2010 | Rajkotia et al. | 455/1 |

(Continued)

OTHER PUBLICATIONS

Simon, M.K.S. et al., Digital Communication Over Fading Channels (2nd ed.), Wiley-Interscience, 2005, ISBN 0471649538.

(Continued)

*Primary Examiner* — Adolf Dsouza
(74) *Attorney, Agent, or Firm* — Oyen Wiggs Green & Mutala LLP (57) ABSTRACT

A data communication system has a station that includes multiple antenna elements. The station communicates to the antenna elements by way of digital data channels. Each antenna is connected to an RF module that receives data by way of a corresponding digital data channel, encodes and transmits the data. Adaptive beamforming may be performed for interference mitigation. Embodiments use the strength of pilot signals and/or error vector magnitudes as cost functions for an adaptive beamforming alogorithm such as optimum combining. Unused sub-carriers may be applied to provide in-band communication to facilitate channel switching, data reallocation and other interference mitigation strategies.

35 Claims, 7 Drawing Sheets

(56) References Cited

U.S. PATENT DOCUMENTS

2010/0233970 A1* 9/2010 Pummer ............... 455/70
2011/0012787 A1* 1/2011 Na et al. ............... 342/373

OTHER PUBLICATIONS

Stuber, G.L. et al., "Broadband MIMO-OFDM Wireless Communications", Proceedings of the IEEE, vol. 92, No. 2, Feb. 2004.
El Zooghby, A., Smart Antenna Engineering, Artech House, 2005, ISBN 1580535151.
Godara, L.C., Smart Antennas, CRC Press, 2004, ISBN 084931206X.
Boccuzzi, J., Signal Processing for Wireless Communications, McGraw-Hill Professional, 2007, ISBN 0071489053.
Pan, Y-H. et al., "Adaptive Beamforming with Antenna Selection in MIMO Systems", IEEE, 2004.
Sayed, A.H., Adaptive Filters, John Wiley and Sons, 2008.
Budsabathon, M. et al., "Optimum Beamforming for Pre-FFT OFDM Adaptive Antenna Array", IEEE Transactions on Vehicular Technology, vol. 53, No. 4, Jul. 2004.
Collados, M. et al., "Antenna Selection for MIMO-OFDM WLAN Systems", IEEE, 2004.
Matsuoka, H. et al., "Comparison of pre-FFT and post-FFT processing adaptive arrays for OFDM systems in the presence of co-channel interference", The 14th IEEE 2003 International Symposium on Personal, Indoor and Mobile Radio Communication Proceedings, 2003.
Mehrtash, A. et al., "Improving the Performance of Post-FFT Array Processing in OFDM Systems with Short Training Sequences", IEEE, 2006.
Moreira, J.D. et al., "Diversity Techniques for OFDM Based WLAN Systems", IEEE, 2002.
Ning, M. et al., "A Simple and Effective Post-FFT Beamforming Technique for QAM-OFDM Systems", IEEE 2007 International Symposium on Microwave, Antenna, Propagation, and EMC Technologies for Wireless Communications, 2007.

* cited by examiner

REASSIGNMENT OF DATA AMONG SUBCARRIERS IN WIRELESS DATA COMMUNICATION

REFERENCE TO RELATED APPLICATION

This application claims the benefit under 35 U.S.C. §119 of U.S. Patent Application No. 61/248623 filed on 5 Oct. 2009 and entitled WIRELESS DATA COMMUNICATION METHODS AND APPARATUS, which is hereby incorporated by reference herein.

TECHNICAL FIELD

The invention relates to wireless data communication and provides both methods and apparatus for wireless data communication. The invention has particular application to wireless data communications which implement an orthogonal frequency division multiplexing (OFDM) protocol. Examples of such protocols are specified by the IEEE 802.11 standards. Aspects of the invention also have application to other protocols and modulation types.

BACKGROUND

Wireless data communication channels are affected by interference and various other effects. If not addressed, these effects can make wireless data communication channels unreliable. Some of these effects arise and/or are particularly difficult to address where one or more stations on the data communication channel are not at fixed locations. Time variations in a communication channel may be caused by moving terminals, moving interference sources, time-varying interference, and/or changing propagation paths caused, for example, by moving radiowave scatterers and the like. Examples of moving radiowave scatterers include close-proximity moving vehicles or scintillating scattering from a rippling water surface. An example of a time-varying interference signal is the signal from a frequency hopping communications system.

Sources of problems with wireless communication channels include effects that cause a low signal power relative to the noise power plus interference power, at the receiver. These include:

- path loss caused by long distances or by other excessive radiowave attenuation between the transmitter and receiver terminals;
- multipath fades, which result from destructive interference at a receiving antenna as a result of radiowave signals traveling via multiple propagation paths;
- other signals competing to use the same radio spectrum at the same time (these signals are called interference). In licensed frequency bands, interference is typically less of a problem than it is within the unlicensed bands.

Interference can be exacerbated when the path loss is large as can occur, for example, where data transmission occurs over long distances and/or where the directional transmit power of the transmitted signal is low. Directional transmit power is typically constrained by law (for example by the Radio Regulations). There are no legal constraints on the directional gain of a receiving antenna. However, the higher the directional gain of an antenna, the narrower its beamwidth. A narrow beamwidth makes it more difficult to achieve and maintain alignment between a receive antenna and a desired signal. High directional gain, fixed-beam antennas, are normally unsuitable for mobile terminals because of this beam alignment problem.

The above-mentioned problems can cause reduced data throughput in the communications link. In extreme cases the communication channel becomes unusable. Such extreme cases are ubiquitous in the unlicensed industrial, scientific, and medical (ISM) radio frequency bands, where many users exploit the freely available radio spectrum for communications, including attempts at long distance communications.

Many industrial and commercial links operate in non-licensed bands, for example, the industrial, scientific, and medical (ISM) bands. The ISM bands are defined by the Radio Regulations of the International Telecommunications Union Radiocommunication sector (ITU-R). The ISM bands include bands at about 0.9 GHz, 2.4 GHz, and 5.8 GHz, among others. Current commercial wireless systems use the ISM bands at frequencies as high as about 60 GHz. The advantage of using these non-licensed bands is that the spectrum is free to use. The use of other (licensed) spectrum is expensive.

OFDM-based WiFi (an 802-11 standard) has emerged as the de-facto standard technology for unlicensed broadband communications. The basic reason for its success is that the architecture, when mass produced, is very inexpensive. A single digital transmitter and receiver are used for many different data streams which occupy separate, adjacent narrow bandwidths. The use of the many data streams permits high data throughput. The many narrow bandwidth data streams sum to occupy a wide bandwidth. Unlike many wideband signaling systems, currently available OFDM systems are highly susceptible to narrowband interference signals. 802.11n, which is a current iteration of WiFi standards has various features that can be used to improve performance (e.g. to improve data throughput in environments where received signals have a low signal-to-noise ratio (SNR) per unit bandwidth). However, our measurements, as well as those of others have indicated that systems which use the 802.11 standards do not work well and often not at all, in the presence of interference.

In ISM bands, the maximum transmit power levels are restricted (regulated in North America by the FCC and Industry Canada), but there is no regulatory coordination in the sharing of this spectrum. Therefore, broadband OFDM communications systems operating in ISM bands are particularly susceptible to interference from other users of the spectrum.

Much of the energy in the 2.4 GHz and 5.8 GHz ISM bands is generated by WiFi devices. Although WiFi systems are designed to coexist in the same space and use the same spectrum, they still compete for available capacity. The problem of interference caused by other WiFi systems is increasing because the number of WiFi users is increasing. In some locations, there are so many competing signals (both from WiFi and non-WiFi signal sources) that high throughput systems, as required in several industrial/commercial links are unworkable using currently-available technology.

Industrial/commercial applications that deploy long-distance broadband links in ISM bands typically use commercial grade WiFi radio modules such as those available from Ubiquiti Networks of Milipitas Calif. USA coupled with high-gain, fixed antennas to achieve the required range. However, such fixed-antenna systems remain susceptible to interference.

It is known to use adaptive antennas for interference cancellation and for enhancing gain of wanted signals. An adaptive antenna ideally strives to maximize the received power of a wanted signal to the sum of interference power and noise power. This ratio is known as the SINR. Here and in the following discussion, "power" refers to the power within time- and frequency-bands of interest except as otherwise indicated. Adaptive antennas of various types can provide improved gain for receiving wanted signals and reduced gain for receiving unwanted signals. However, many adaptive antennas do not perform as well as would be desired, especially in the presence of interference.

An adaptive antenna, in receiving mode, normally comprises several antenna elements. Signals received at the different antenna elements are combined in order to optimize some aspect of transmission. Some adaptive antennas receive signals from different antenna elements antennas, and combine these signals using variable weights in order to get improved reception. In transmit mode, similar adjustments can be made to the antenna parameters, for example adjusting the weights of signals transmitted by different elements in order to maximize transmit gain in particular directions. Adaptive antennas at transmitting and receiving ends of a communication link can be jointly optimized to maximize transmission gain as well. This is a form of MIMO (multiple input, multiple output) communication.

U.S. Pat. No. 7,257,425 discloses a 'smart antenna' module which weighs and combines signals received by multiple antennas.

There is a need for robust data communication systems that are practical and cost-effective. There is a specific need for such systems suitable for providing ship-to-shore data communication or other data communication with a moving endpoint. Among the many specific applications scenarios, there is a need for such systems suitable for providing ship-to-shore data communication or other data communication with moving terminals. Advantageously, such systems could operate in an ISM band. Ship-to-shore radio has finite range because of the severe path loss (for long ranges, the path gain can be proportional to the inverse-fourth power with distance, as opposed to inverse square law as in free space) over the water. Moreover, particularly with ferry services linking built-up ports, the port and its surrounding areas (often within, or close to, a city) feature many radio users, so the level of interference is high at the locations where one may wish to locate terrestrial transceivers.

SUMMARY OF THE INVENTION

The invention is for the functional architecture and implementation of an adaptive antenna system. In one configuration, the adaptive antenna system can be appended to existing radio system transceivers at each end of the radio link. This allows the use of low-priced wireless systems, in particular OFDM-based ones, and apart from the performance improvement, the adaptive antenna system is functionally invisible to the user. In another configuration, the OFDM radio (full receiver) is integrated into the adaptive antenna system. Again, the adaptive antenna is functionally invisible to the radio link user. However, the link is higher quality—the higher quality rendered through metrics such as higher capacity efficiency, higher capacity, larger range, etc.

An adaptive antenna system generically comprises several antenna elements and combines the signals to/from these using a cost function and an adaptive algorithm. Some different parts and their novel combination, including their combination with known systems such as the adaptive algorithm, are the subject of this patent.

The signals are digitized and digitally processed within the adaptive antenna system. The adaptive antennas at each end of the link have built-in means to communicate with each other—transparently to the user—which allows enhanced control of the adaptation of the antennas' settings, including the weights. In particular, "beacon" signals can be added to the transmitted signal (by the system at the transmit end), and detected by the system at the receiver end, in order to facilitate the adaptation of the receiving antenna system.

The main features of our system include:
- a signal processing architecture and method to allow the relative physical arrangement (location, orientation, and/or pointing direction) of the elements of the adaptive antenna system to be flexible, or be non-critical;
- the concept for a method for adding a beacon signal to OFDM type radio systems as part of a system which is functionally transparent to the user;
- a method for detecting the level of interference very quickly, so that the associated cost function for the adaptation is enabled to have a quick response, meaning that adaptation to changing interference can be quick;
- a method for dealing with narrow band interference within the band occupied by OFDM radio systems is described (This latter claim can operate within the adaptive antenna system, but does not need an adaptive antenna with multiple antennas to support it) in which the subcarriers that are affected by interference are swapped with spectral positions normally reserved by the protocol Standard for unused subcarrier positions;
- an integrated method to change the frequency band of the link (sometimes called "frequency diversity") between the adaptive antennas at the transmit and receive ends, which allows the link to adapt to a different band where the transmission is better (i.e., less interference or better propagation conditions, etc.) according to the cost function, or allows the link to start up if for example one of the available bands has interference conditions that even the adaptive antenna cannot mitigate.

The novel combination of these techniques to realize a communications system which will operate in the presence of interference and/or severe path loss.

Many existing classes of adaptive antenna structures and the many types of adaptive algorithms are well addressed in the literature, but a particular cost function for antennas for digital communications, and its implementation, are described below and claimed. This cost function and its implementation is general for adaptive systems using digital communications, and could well be used to control many different types of adaptive antennas and other adaptive reception processors, through the use of many different adaptive algorithms.

This patent is for an adaptive an antenna system which includes a claim for an inexpensive method for quickly estimating the varying SINR in a digital communications system, and which will work as a cost function (see below) for any adaptive antenna. In this patent disclosure, this specific application for ship-to-shore for ferries is referred to, but the patent also applies to other scenarios, such as fixed links (eg., building-to-building) and mobile and nomadic links.

Further aspects of the invention and features of specific embodiments of the invention are described below.

BRIEF DESCRIPTION OF THE DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
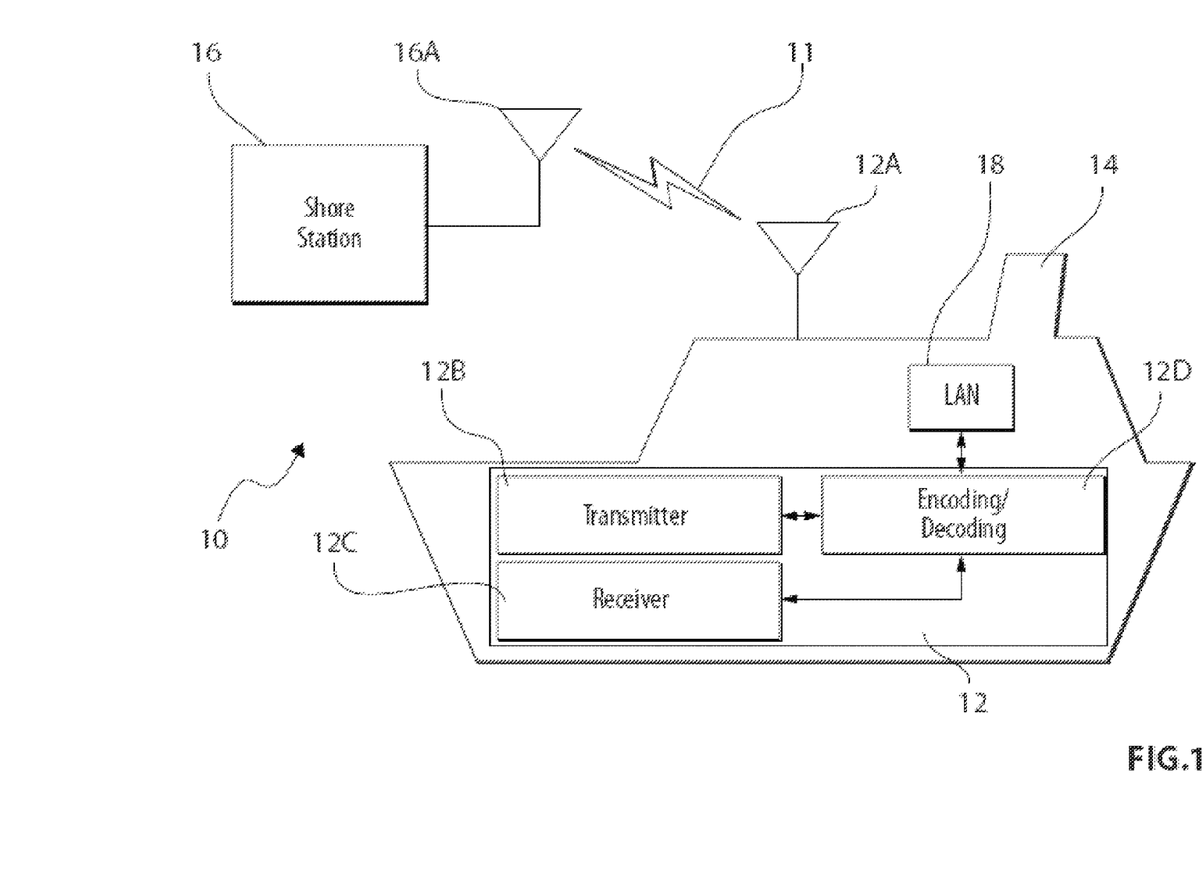
FIG. 1 is a block diagram of a data communication system according to an example embodiment of the invention.

FIG. 1 shows an example data communication system 10. This system is shown as an example only. The methods and apparatus described herein may be applied to provide data communication in many other contexts. System 10 provides data communication on a communication link 11 between a mobile station 12 on a ship 14 and a shore station 16. The inventions described herein may be applied in many other contexts such as communication between fixed stations, communication among vehicles travelling by land, air or water or communication between such vehicles and fixed stations etc.

Mobile station 12 comprises an antenna system 12A, a radio transmitter 12B connected to transmit radio signals by way of antenna system 12A, a radio receiver 12C connected to detect radio signals received at antenna system 12A, and a data encoding/decoding system 12D. In the illustrated embodiment, system 10 includes a local network 18 on ship 14 that provides data communication among devices (not shown) located on ship 14 and/or data communication between devices located on ship 14 and shore station 16. Shore station 16 may have a connection to the internet, thereby providing a path by which the devices can access the internet.

Communication link 11 operates in a suitable frequency band which may be an ISM band. The methods and apparatus described herein are not limited in application to any specific band or to ISM bands although embodiments that operate in ISM bands may be commercially advantageous. Several different ISM frequency bands are available. The appropriate band may be selected for a particular application based on factors such as:

Which band provides the most desirable propagation characteristics between endpoints of the channel. For example, lower frequency bands (e.g. 915 MHz) may have advantageous propagation characteristics over longer distances or in non-line-of sight deployments.

Constraints on the size or cost of antennas. Higher frequency bands (e.g. 2.4 GHz or 5.8 GHz) feature smaller antenna structures.

The amount of interference on different bands.

The nature of the terrain. For example a frequency band having a center frequency of 900 MHz has some advantageous propagation characteristics over water.

The ability of different bands to accommodate the bandwidth of the signal of communication link 11 without excessive interference.

etc.

An example embodiment operates in the 5.8 GHz ISM band.

Because of the wide range of devices that may be operating in the area through which communication link 11 extends, the interference environment is continually changing. System 10 implements an adaptive interference mitigation system, as described in more detail below. The adaptive interference mitigation system may incorporate features of known adaptive antenna systems in combination with novel features as described herein. Such features are understood by those of skill in the art and therefore are not described in complete detail herein.

In the illustrated embodiment, antenna system 12A and/or an antenna system 16A of shore station 16 each comprises a plurality of antennas (or antenna elements). The antennas of antenna systems 12A and/or 16A may be arranged as arrays (which may or may not comprise well-defined, regular arrangements of identical antenna elements). In some embodiments, some or all of the antenna elements are different from others of the antenna elements and/or the antenna elements are arranged in an irregular manner. Such antenna systems are sometimes called multiple element antennas (MEAs).

The antennas of antenna systems 12A and/or 16A may be fixed or reconfigurable. In some embodiments, some or all of the antennas are mechanically reconfigurable such that the pattern or some other antenna parameter or property can be controlled by moving or reconfiguring the antenna structure, moving antenna elements with respect to each other, and/or by changing (including switching) the load impedances of close-proximity parasitic elements.

Interference mitigation is performed by adaptively controlling the transmission and/or reception of the desired signals. This adaptive control may comprise, for example, one or more of:

adjusting the manner in which the antennas are driven to transmit signals (for example, adjusting the phase and/or amplitude of the outgoing transmitted signal from each antenna);

adjusting the manner in which signals picked up by the different antennas are combined to yield a received signal (for example, adjusting the phase and/or amplitude of incoming received signal from each antenna);

shifting a frequency (channel) of the transmitted signal;

adjusting locations, configurations or orientations of transmitting and/or receive antennas;

adjusting a power spectrum of the transmitted signal;

Re-arranging the spectral assignment of the information-carrying sub-carriers within the OFDM modulation to mitigate narrowband interference;

etc.

A cost function is applied to guide adjustment of the interference mitigation. This is discussed in more detail below.

The cost function represents, in general, some aspect of transmission performance. The cost function is provided as an input to an adaptive algorithm that controls the interference mitigation. Cost functions of a number of novel types are described below and some specific examples of such cost functions are also described below. In some embodiments, the cost function is implemented as a scalar or vector signal whose strength indicates an aspect of the performance of a communication link that is to be optimized.

An adaptive algorithm works to adjust one or more aspects of the operation of communication link 11 in response to the cost function. For example, the adaptive algorithm may operate to minimize the cost function where a reduction of the value of the cost function corresponds to an increase in some aspect of the performance of communication link 11.

Figure 2:
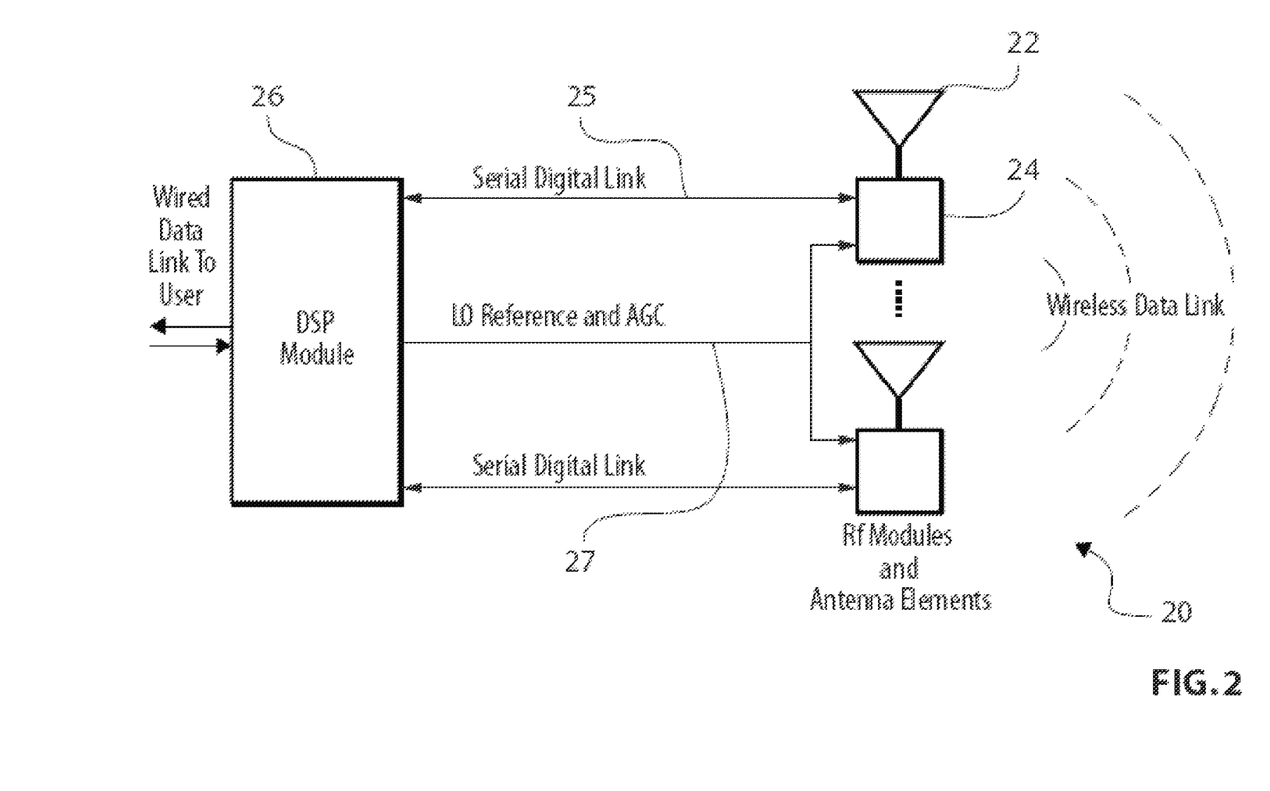
FIG. 2 is a block diagram of a data communication system having a multiple element antenna architecture.

FIG. 2 shows schematically a system 20. System 20 illustrates one way to implement a system that comprises a multiple element antenna system. System 20 comprises a plurality of antenna elements 22 each associated with an RF module 24. RF modules 24 may be co-located with antennas 22. RF modules 24 receive and digitize radiofrequency (RF) signals. The digitized signals are provided to a digital signal processor (DSP) module 26 by way of data links 25. DSP module 26 may optionally be housed together with one of RF modules 24. data links 25 may comprise suitable wired, optical fibre, or wireless data links. A shared signalling line 27 provides signalling common to RF modules 24 (for example, gain control signals and local oscillator reference signals). Signalling line 27 may be provided by a wireless connection or by way of a physical link such as a cable (including coax cable, fibre optic cable) or the like.

In certain cases interference cancellation can be improved by providing antenna elements 22 that are widely spaced. Implementing communication between RF modules 24 and DSP module 26 by way of digital links facilitates wide spacing of antenna elements 22, where wide spacing is desired. The total transmit power of communication link 11 is divided among RF modules 24. This reduces the power handling requirements, and cost, of each RF module 24. An advantage of the some embodiments as illustrated in FIG. 2 is that precise positioning of the different antenna elements 22 is not required.

The radiation pattern of signals transmitted by the multiple element antenna of system 20 is determined by the structures and locations of antenna elements 22, the frequency of the transmitted signal and the relative phases and amplitudes with which the signal is transmitted by different ones of antenna elements 22. In the illustrated embodiment, the phases and amplitudes with which signals are transmitted by each antenna element 22 is adjustable. This may be done by controlling the relative phase and amplitude weighting of the receive and transmit signals from each RF module 24. In the illustrated embodiment, the weighting is done digitally in DSP module 26. The effective phase and amplitude is physically realized at the digital-to-analog (DAC) and analog-to-digital convertors (ADC). The digital link 25 between the RF modules 24 and DSP module 26 allows the digital-to-analog conversion (DAC and ADC) to occur very close to antenna elements 22. Thus, any variability in the interconnection between RF modules 24 and DSP module 26 will not affect the resulting radiation pattern.

Each RF module 24 is depicted in FIG. 2 as driving one antenna element 22. In alternative embodiments, some or all RF modules 24 may be connected to two or more antenna elements 22. In such embodiments, the antenna elements connected to each RF module 24 may be considered to be a sub-array. In such embodiments, interference mitigation may comprise controlling the way in which signals from different sub-arrays are combined, controlling the arrangement, orientation, configuration and/or electrical characteristics of antenna elements 22 within one or more sub-arrays and/or controlling the manner in which different sub-arrays are driven.

Figure 3:
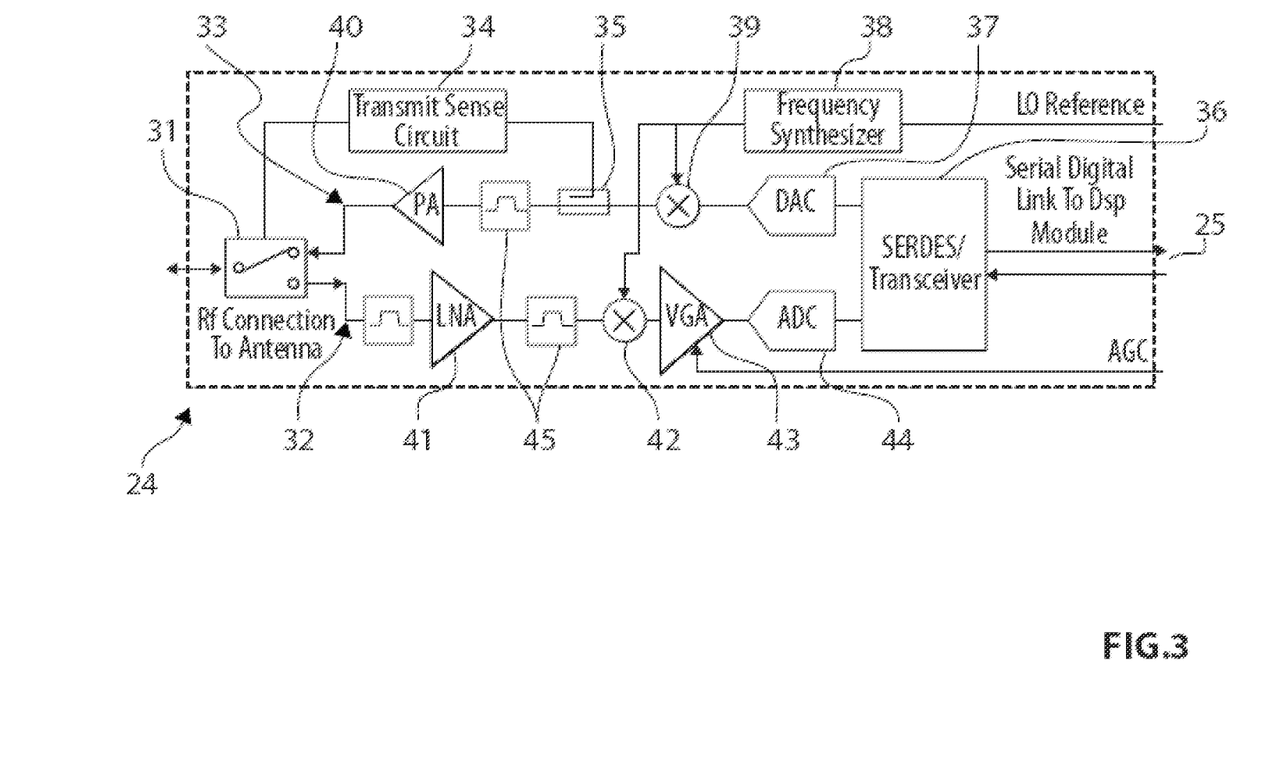
FIG. 3 is a block diagram showing an example of a possible architecture for an RF module.

FIG. 3 shows an example of a possible architecture for an RF module 24. The illustrated RF module 24 operates in a receive mode except at times when there is a signal to be transmitted. A switch 31 connects the associated antenna element 22 (not shown in FIG. 3) either to receiver electronics 32 or transmit electronics 33. A transmit sense circuit 34 switches switch 31 so that transmit electronics 33 is connected to antenna element 22 when a transmit signal is sensed at signal detector 35 (which may comprise a directional coupler) and leaves receiver electronics 32 connected to antenna element 22 otherwise.

RF module 24 comprises a transceiver 36 that receives digital data from data link 25. In some embodiments, transceiver 36 comprises a serial-to-parallel transceiver that converts parallel digital data from analog-to-digital converter 44 to serial digital data and sends the serial data over data link 25 to DSP module 26. Transceiver 36 may also convert serial digital data received on data link 25 to parallel digital data and passes the parallel data to digital-to-analog converter 37 which provides an analog output signal. The analog output signal is applied to modulate a carrier signal generated by a frequency synthesiser 38 at a mixer 39. The modulated carrier signal is amplified by a power amplifier 40.

When a signal is received at antenna element 22 the signal is amplified by a low noise amplifier 41 and mixed with a signal from frequency synthesiser 38 at a mixer 42 to yield an intermediate frequency signal that is amplified by a variable-gain amplifier 43. The output from variable gain amplifier 43 is digitized by an analog to digital converter 44. The digital output from analog to digital converter 44 is received by transceiver 36 and forwarded on data link 25 to DSP module 26. Also shown in FIG. 3 are bandpass filters 45 chosen to pass the desired signals and reject other signals.

Figure 4:
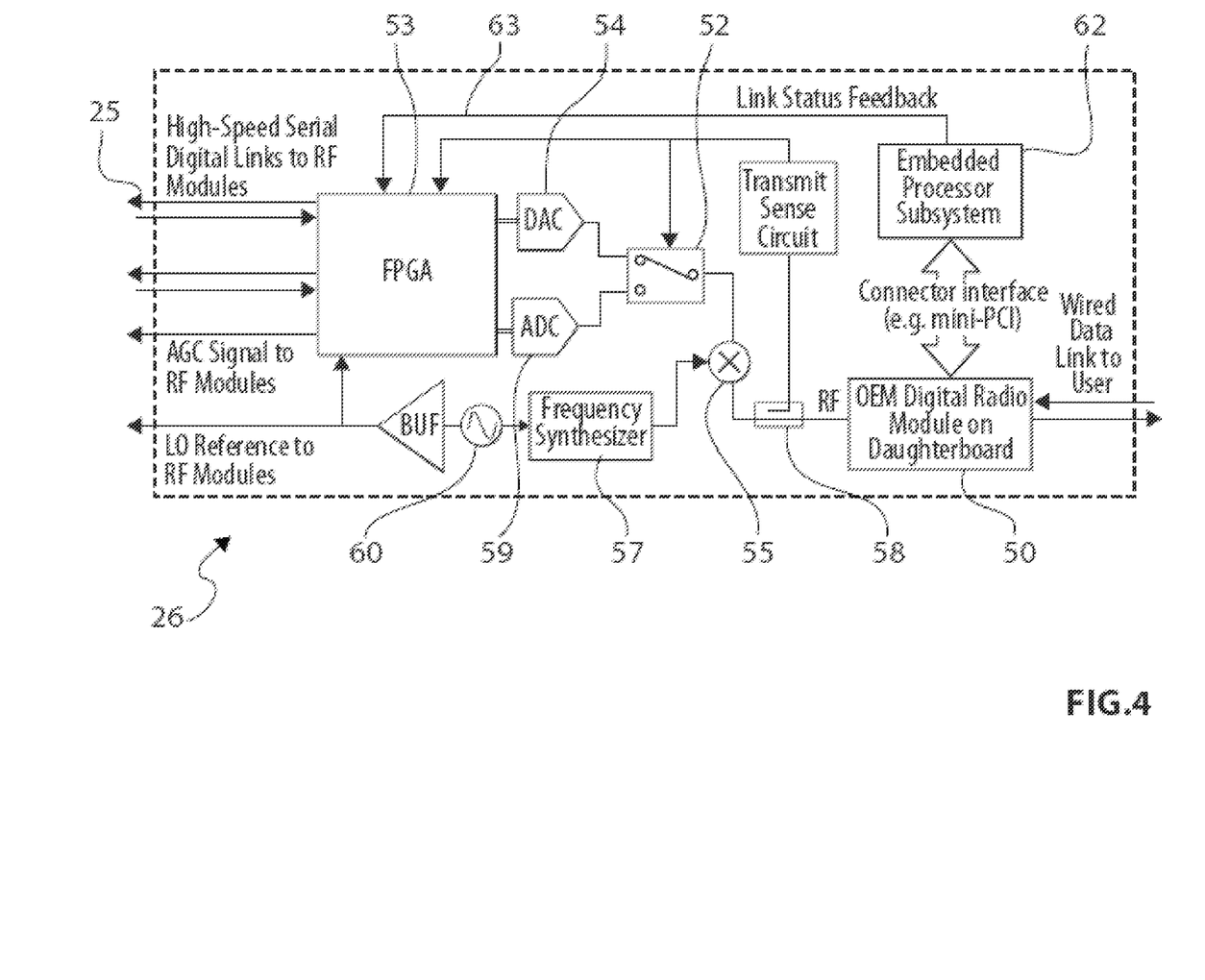
FIG. 4 is a block diagram showing an example of a possible architecture for a DSP module.

FIG. 4 shows an example of a possible architecture for a DSP module 26. DSP module 26 comprises a digital radio module 50 that is connected to receive data to be transmitted (for example, from a connected computer or other device or a LAN). Digital radio module 50 can generate an RF signal in which data to be transmitted is encoded according to the protocol of communication link 11. Digital radio module 50 can receive an RF signal in which digital data has been encoded and extract the encoded digital data from the received RF signal. Suitable digital radio modules which can encode and decode data according to suitable protocols are commercially available. Examples of suitable protocols are the 802.11a, 802.11g and 802.11n protocols.

DSP module 26 includes a switch 52 that normally connects digital radio module 50 to receive signals collected by antennas 22. The signals are received by way of data links 25 at signal processing logic 53. In the illustrated embodiment, signal processing logic 53 comprises a field-programmable gate array (FPGA). In other embodiments, signal processing could be provided by a suitable ASIC (application specific integrated circuit), logic circuits which may comprise more than one chip or other components, and/or suitable programmable processors. After processing, the received signals are presented at a digital to analog converter 54 and then carried to a mixer 55 by way of switch 52. At mixer 55 the signal is mixed with a carrier signal generated by a frequency synthesizer 57 to yield a modulated signal that is presented at the RF input of digital radio module 50.

When digital radio module 50 receives data to be transmitted, digital radio module 50 encodes the data in an RF signal according to the protocol of communication link 11 (which may be a suitable standard protocol) and presents that signal at its output. The signal passes through a signal detector 58 (which may comprise a directional coupler) which causes switch 52 to switch to its 'TRANSMIT' position. The signal passes through mixer 55 and is presented at the input of analog to digital converter (ADC) 59. The digitized output of ADC 59 is processed by signal processing logic 53 to yield digital signals to be delivered to individual RF modules 24 by way of the corresponding data links 25.

Frequency synthesizer 57 generates the carrier signal based on the output of an oscillator 60. The output of oscillator 60 is also provided to RF modules 24 where it drives frequency synthesizers 38 (see FIG. 3). The frequencies used to transmit and receive data on communication link 11 may be set by changing the output frequencies produced by frequency synthesizers 38.

Embodiments of the invention provide for interference mitigation. Interference mitigation can improve the performance of a wireless communications link. Interference mitigation may be performed based on one or more of a number of factors. In the illustrated embodiment, information derived from the received signals and information regarding link status are used to provide adaptive control over the way in which received signals are weighted and combined by signal processing logic 53. In the illustrated embodiment, an embedded processor system 62 executes software that causes the processor system to obtain regular link status updates from digital radio module 50. Embedded processor system 62 may communicate with digital radio module 50 by way of a suitable connection. Mini-PCI is an example of a type of connector that may be used to connect embedded processor system 62 to digital radio module 50. Embedded processor system 62 generates a link status signal 63 that is provided to signal processing logic 53. Signal processing logic 53 also, or in the alternative, performs analysis of received signals to obtain information on which the adaptive control can be based.

In many environments interference can change rapidly, for example because interference comes from multiple sources and/or one or both ends of communication link 11 are moving. Advantageously the adaptive control applied for interference mitigation has a rapid response time.

In some embodiments, interference mitigation is based at least in part on detecting pilot signals that are inserted into signals transmitted across communication link 11. In specific embodiments the protocol of communication link 11 provides a number of sub-carriers that are distinguishable from one another on the basis of frequency. A combination of one or more pilot signals that is unique to communication link 11 is inserted into one or more of the sub-carriers. The pilot signals permit signal processing logic 23 or other parts of a system to differentiate instantaneously between a wanted WiFi signal (which contains the pilot signals) and interference, especially other WiFi signals. The interference is immediately recognizable because it does not contain the link-specific pilot signals.

A measure based on the detected pilot signals may be used as a cost function for adaptive control of an antenna array. In some embodiments, the cost function is a ratio of pilot power to total received power.

Pilot signals may have different forms The pilot signals are preferably modulated, for example with a pseudo-random (PN) sequence or a specific predetermined sequence so that they can be distinguished from interference at the same frequency. In some embodiments, one or more pilot signals are encoded to carry data. The data may be used to facilitate adaptive control of the system to mitigate interference in some embodiments. For example, one or more pilot signals may have a packet structure, with a preamble followed by data.

The available sub-carriers may be used to carry pilot signals in different ways including:
One or more of the sub-carriers not used for carrying data may be used simultaneously for pilot signals;
The pilot scheme may frequency-hop to utilize some or all of the sub-carriers not used for carrying data over a defined period.

It is not mandatory that the pilot signal(s) be provided only on otherwise unused sub-carrier slots. A pilot signal may be provided in a sub-carrier slot normally used to carry data.

In the ISM bands, transmitted EIRP (equivalent isotropically radiated power) is regulated. Some transmit power must be allocated to the pilot signals. This takes away from the transmit power that can be allocated to data symbols. In some embodiments the power allocated to the pilot signal or signals is dynamically changed as part of the adaptive control. In such embodiments, the power allocated to the pilot signal or signals may be controlled to have a low level that is sufficient for the pilot signal or signals to be detected. The power allocated to the pilot signal or signals may be automatically increased if it becomes difficult to detect the pilot signal or signals. The power allocated to the pilot signal or signals may be automatically decreased if the pilot signal or signals are received with a signal strength higher than a threshold. A first end of communication link 11 may transmit data regarding the signal strength of pilot signals received from the second end of communication link 11 by way of the pilot signals transmitted from the first end to the second end, for example.

In some embodiments, the pilot power is maximized for urgent signal acquisition action. In some embodiments, the pilot signal power is set to a very low value or zero in good channel conditions.

Figure 5:
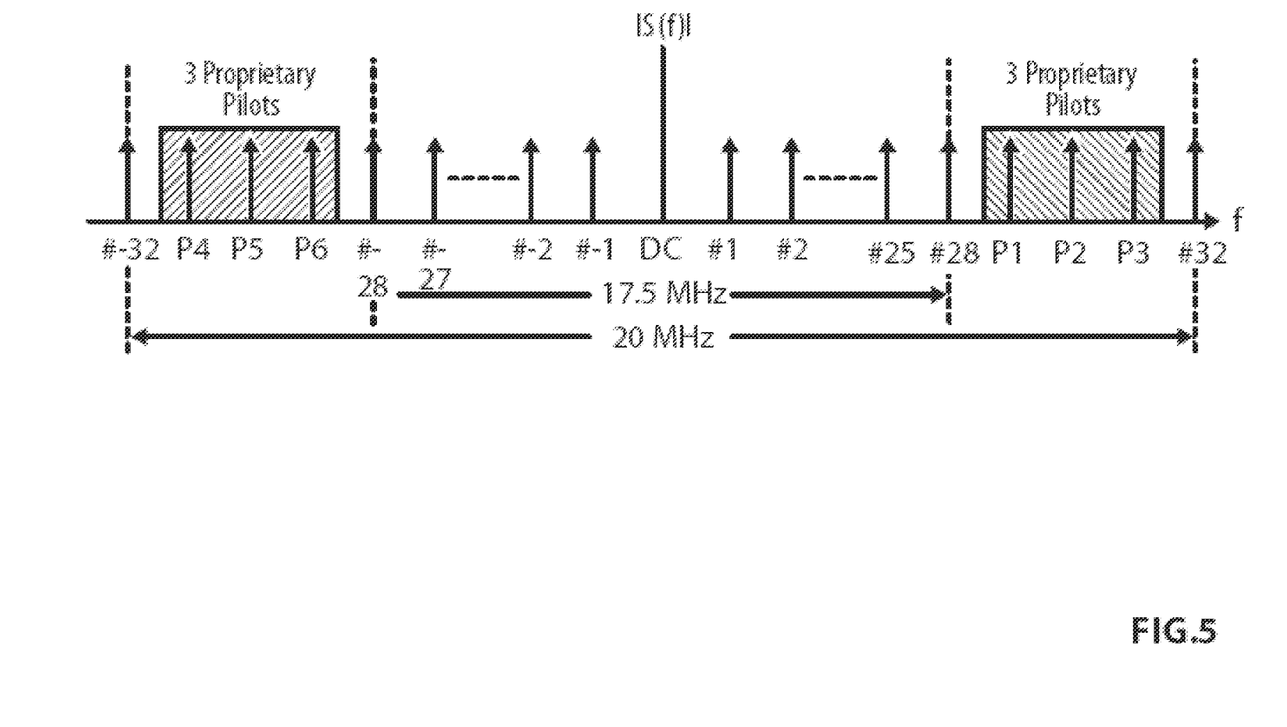
FIG. 5 is a chart showing the spectral assignment of sub-carriers in an 802.11 OFDM signal along with pilot signals (P1 to P6) that are not used in the 802.11 standards.

In embodiments where communication link 11 operates according to an 802.11 protocol, the pilot signals may be carried in sub-carriers that are not normally used to carry data. FIG. 5 shows the spectral assignment of sub-carriers in an 802.11 OFDM signal. There are 64 sub-carriers but only 58 of those sub-carriers are specified for use in carrying data. The remaining six sub-carriers are not used for data transmission. In example embodiments of the invention, pilot signals are encoded in some or all of these six otherwise-unused sub-carriers. The pilot signals are identified as P1 to P6 in FIG. 5.

Normally, a 64-point IFFT (inverse fast Fourier transform) is used to extract 802.11 OFDM symbols from a received signal. The same technique may be applied to extract pilot signals.

Once initialized and running, a system may detect the ratio of pilot signal power to the total power received in the bandwidth of a channel being used by communication link 11. This ratio, as a cost function, can distinguish the wanted link source from non-WiFi interferers and other-WiFi interferers. A low ratio indicates that there must be significant interference on the channel being used by communication link 11. A higher ratio indicates that there is less interference on the channel. This ratio may be applied as an input to an adaptive beamforming algorithm that seeks to minimize interference.

Many suitable adaptive algorithms are described in the literature. These adaptive algorithms and other suitable adaptive algorithms that may be developed in the future may be applied in the context of the invention. Various adaptive algorithms are described, for example in A. H. Sayed, "Adaptive Filters", John Wiley and Sons, 2008. There are tradeoffs between factors such as complexity, speed, required memory size, and so on that may be taken into account in selecting an adaptive algorithm for any specific implementation.

An alternative measure of interference, which may be applied as a cost function in adaptive beamforming for interference mitigation or other applications or applied in the control other aspects of a communication link, involves determining an error vector magnitude (EVM) for symbols transmitted on a communication link 11. The EVM provides a measure of the level of interference affecting communication link 11.

An EVM may be computed for each received symbol. Doing so can provide a measure of the received signal quality on each sub-carrier. The EVM may be updated at the OFDM symbol rate. This allows an algorithm performing interference mitigation (such as an adaptive beamforming algorithm) to perform iterations at the OFDM symbol rate.

For each OFDM symbol, the EVM is determined for the digital symbols received on each OFDM sub-carrier. EVM may be determined by computing the difference between each received symbol (i.e., the symbol estimate) and the nearest valid symbol position in the digital signalling constellation in the protocol being used to modulate the sub-carrier of communication link 11. This difference is an error vector. The magnitude of the error vector (e.g. the Euclidean distance between each received symbol and the nearest valid symbol position) is the EVM. The EVM is an instantaneous measure of the noise plus interference for that symbol period.

Computation of the EVM does not require prior knowledge of the transmitted symbols. All that is needed is that the estimate of the received symbol is within the decision boundaries for the correct symbol (i.e., the symbol transmitted). The EVM may become unreliable as a measure of interference if the estimates of the received symbols are within the decision boundaries for incorrect signals. This may happen, for example, when the signal-to-interference-plus-noise ratio (SINR) of communication channel 11 is low. Such a situation can be detected by observing the variance of the EVM. If the variance of the EVM remains small then the EVM is likely to be a reliable indicator of the level of interference. If the variance of the EVM becomes large then the EVM is less reliable as an indication of the degree of interference.

In practice, in cases where conditions are so poor that estimates of received symbols are more than occasionally within the decision boundaries for incorrect signals, the OFDM radio should automatically reduce throughput (i.e., reduce the population digital signalling constellation to increase the size of decision regions for valid symbols) to the point where estimates of received symbols are within decision regions for the correct symbols.

The error vector may be used in various ways. As noted above, the EVM or other values that vary with the EVM may be used as cost functions in adaptive algorithms. Some additional ways in which the error function may be applied are as follows:

Successive values for the EVM may be averaged to provide an averaged EVM. The averaged interference-plus-noise to average-signal-power ratio (the inverse of the SINR) may be obtained by dividing the averaged EVM by the average symbol energy for the constellation and squaring the result.

The temporal behaviour of the error vector (e.g., the progression of the phase of the error vector) may be applied for controlling receiver settings, including settings of an adaptive antenna system.

A SINR estimate may be obtained for each subcarrier of the OFDM system, relative to the average SINR across the OFDM bandwidth. These estimates can provide rapid indications of the onset of narrowband interference affecting one or more subcarriers. These SINR estimates or equivalent values may be applied to control signal processing to counter the narrowband interference.

An adaptive algorithm may be configured to maximize the SINR in response to the cost function. In some embodiments, the adaptive algorithm also monitors the throughput of communication link 11. The adaptive algorithm may, for example operate according to an optimal combining strategy to set beamforming weights for the different antennas 22. Optimum combining and other strategies for optimizing beamforming weights based on a cost function are described, for example, in the following works:

Marvin Kenneth Simon et al. *Digital Communication Over Fading Channels* ($2^{nd}$ ed.) Wiley-Interscience, 2005 ISBN 0471649538;

George V. Tsoulos *Adaptive antennas for wireless communications* IEEE Antennas and Propagation Society IEEE Press, 2001 ISBN 0780360168, Ahmed El Zooghby *Smart antenna engineering* Artech House, 2005 ISBN 1580535151, Lal Chand Godara *Smart antennas* CRC Press, 2004 ISBN 084931206X, Joseph Boccuzzi *Signal Processing for Wireless Communications* McGraw-Hill Professional, 2007 ISBN 0071489053, Panayiotis I. Ioannides *Introduction to Smart Antennas* Morgan & Claypool Publishers, 2007 ISBN 1598291769, The adaptive algorithms described in these works are non-limiting examples only. All of these works are hereby incorporated herein by reference.

Adaptive beam steering techniques may fail to reduce interference from an interference source to a desired low level. This may occur, for example where an interference source is located in the main-lobe of the antenna array pattern or very close to one end of communication link 11. In some embodiments, in such cases, in-band signalling by way of the pilot signal(s) is used to coordinate a change in operating channels by the stations using communication link 11. Multiple channels that can be used for carrying OFDM signals (such as 802.11 signals for example) are available within the 5.8 GHz ISM band.

Some embodiments mitigate narrow-band interference by re-allocating data to unused sub-carriers within an OFDM signal. In such embodiments, when one or more sub-carriers are found to suffer from interference, data carried by those sub-carriers may be re-allocated to unused sub-carriers.

For example, the OFDM physical layer implementation as specified in the 802.11 standards, uses a 64-point IFFT to generate OFDM symbols and a 64-point FFT operation to recover the transmitted symbols. In older iterations of the standard (802.11a/802.11g), 52 of the sub-carriers are used by the protocol, and 10 sub-carriers are left empty. In the draft 802.11n standard, 56 sub-carriers are used and 6 sub-carriers are left empty.

In a case where monitoring (e.g., monitoring of EVM) detects that one or a few sub-carriers of communication link 11 are weak or unworkable, then at the transmit end of communication link 11, data that would have been transmitted in those sub-carriers may be reallocated to unused sub-carriers for which the transmission potential is better. At the receive end of communication link 11 the reallocation of data among sub-carriers may be reversed. In some embodiments, the reversal is performed upstream from an OFDM radio at the receive end. In such embodiments, the OFDM radio can operate without any modification of its normal operation. In other embodiments, the reversal is performed in the OFDM radio.

Reallocation of data may be performed using a "patch panel" multiplexer which, in general, routes the 64 (or 128, etc., in larger implementations) sub-carrier symbols to a differently-ordered set of 64 subcarrier positions. Such a muliplexer may be implemented in a range of ways, for example:

using block RAM and addressing logic to reorder bits within block serial data;

providing logic in an FPGA that reorders bits within block serial data;

etc.

In-band signalling implemented on unused sub-carriers as described herein may be applied to coordinate the re-allocation of data to unused sub-carriers. For example, a receiving end of communication link 11 may transmit on unused sub-carriers of communication link 11 data indicating that the quality of received signals on one or a few sub-carriers of communication link 11 is poor. The data may also indicate which normally-unused sub-carriers appear to be best. The transmitting end may then reallocate data from the poor quality sub-carriers to unused-sub carriers. In some embodiments, the transmitting end determines how to reallocate the data and communicates back to the receiving end how the data is being reallocated. In other embodiments the receiving end communicates to the transmitting end how the data should be reallocated. In still other embodiments the receiving and transmitting ends separately determine how the data is to be reallocated based on commonly-held information. In the latter case it is not mandatory to provide communication over communication link 11 regarding how the data is to be reallocated.

Where two or more devices are competing for access to the same channel then some standards, including 802.11 standards, provide for coordinated time division duplex (TDD) channel sharing among the devices. Some embodiments provide a TDD channel sharing mechanism and are configured to disable the TDD channel sharing of the digital radio module 50 when interference is at a low enough level (for example, because interference mitigation is working well). In some such embodiments, when the system is in receive mode and not receiving a wanted signal (as would be indicated, for example, by the detection of unique pilot signals), the activity in the channel is monitored, for example by measuring a received signal strength indicator (RSSI). If this activity is below a certain threshold the received signals are not passed to digital radio module 50. This ensures that digital radio module 50 is free to transmit instead of wasting time receiving weak signals. This essentially "tricks" the digital radio module 50 into behaving as if the channel is unused.

Figure 6A:
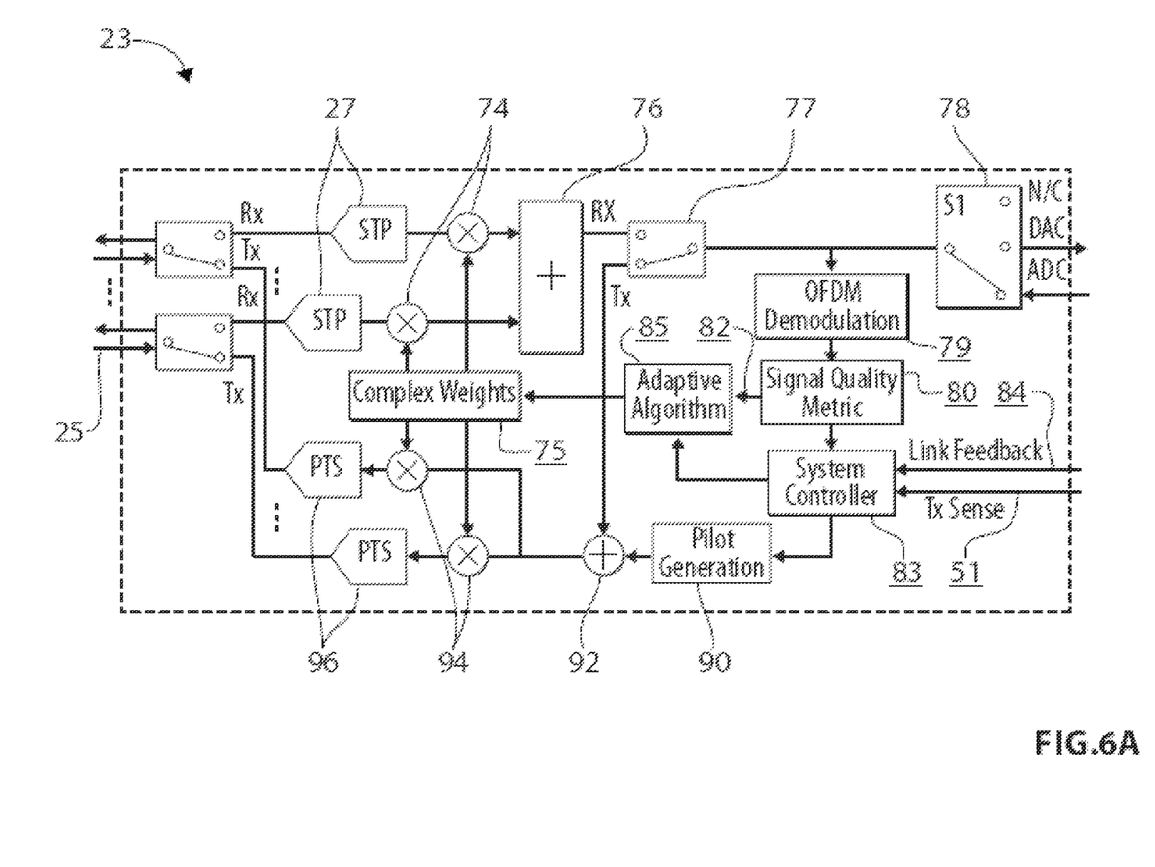
FIGS. 6A and 6B show schematically example configurations for signal processing logic.

FIG. 6A shows schematically an example configuration for a digital signal processing architecture comprising logic 23 that provides for adaptive control over an antenna array. When digital radio module 50 is transmitting, as indicated by the TX Sense input 51 all switches in signal processing logic 23 except master switch 78 are set to their transmit (Tx) positions. Otherwise, the DSP system is in receive mode and all switches of signal processing logic 23, except master switch 78, are in their receive (Rx) positions.

In the receive mode, digital signals from RF modules 24 are received on data links 25. Serial to parallel converters 27 convert serial intermediate frequency signals to parallel. Multipliers 74 weight each signal according to a complex weight $W_i$ contained in a memory (e.g. a register 75 or other memory location accessible to logic 23). The weighted signals are summed at combiner 76 and in receive mode passed to master switch 78 by way of switch 77.

The received signals are also passed through an OFDM demodulator 79. The resulting received data symbol estimates provided to a signal quality metric calculation stage 80 which produces a signal quality metric 82. Signal quality metric calculation may comprise, for example, calculating estimates of EVM, ratios of pilot power to all power in the received signal, and/or other indicators of signal quality. OFDM demodulator 79 may also demodulate any data encoded in pilot signals. Such recovered data may be passed to system controller 83.

An adaptive algorithm 85 receives the signal quality metric 82 and updates the complex weights $W_i$ in memory 75 accordingly. System controller 83 may optionally receive link feedback 84 from digital radio module 50. The link feedback may be used to constrain adaptive algorithm 85.

In some embodiments, system controller 83 can determine whether or not a signal of interest is being received, for example, by determining that pilot signals corresponding to the signal of interest are being received. Information about received signals may be applied to controlling master switch 78.

Master switch 78 may be controlled as follows:

Receive case—If the system detects reception of a wanted signal (for example as indicated by the presence of pilots in the received signal) master switch 78 is connected to the DAC from digital radio module 50. In this configuration, digital radio module 50, may be configured to share the channel with other devices, for example by following a TDD channel-sharing mechanism.

Transmit case—If an outgoing transmission is indicated by Tx Sense input 51, master switch 78 is connected to the ADC signal from digital radio module 50.

Idle case—If the channel is idle (i.e. not transmitting or not receiving a wanted signal) and the received signal strength indication (RSSI) is above a threshold level master switch 78 is connected to the DAC (so that received signals are provided to digital radio module 50). If the channel is idle and the RSSI is below the threshold level, master switch 78 is in the N/C position.

In transmit mode, signal processing logic 23 receives incoming digital signals. Pilot signals generated by a pilot signal generator 90 are added to the signal at point 92. In some embodiment, the pilot signals encode information specified by system controller 83. The signal is multiplied by complex weighting factors for the different antennas at multipliers 94. The weighted signals are passed to parallel to serial converters 96 and forwarded to RF modules 24 corresponding to antennas 22 on data links 25.

Where the same antennas are used for both transmit and receive, conjugate weighting may be used for transmit beam-steering. Phase compensation may be applied to account for the different RF paths taken by transmitted and received signals.

In some embodiments, the assignment of data to OFDM sub-carriers is re-arranged to improve performance. For example, data from one or more sub-carriers affected by narrowband interference may be reassigned to be carried on other sub-carriers (which may include one or more pilot sub-carriers, for example.

Figure 6B:
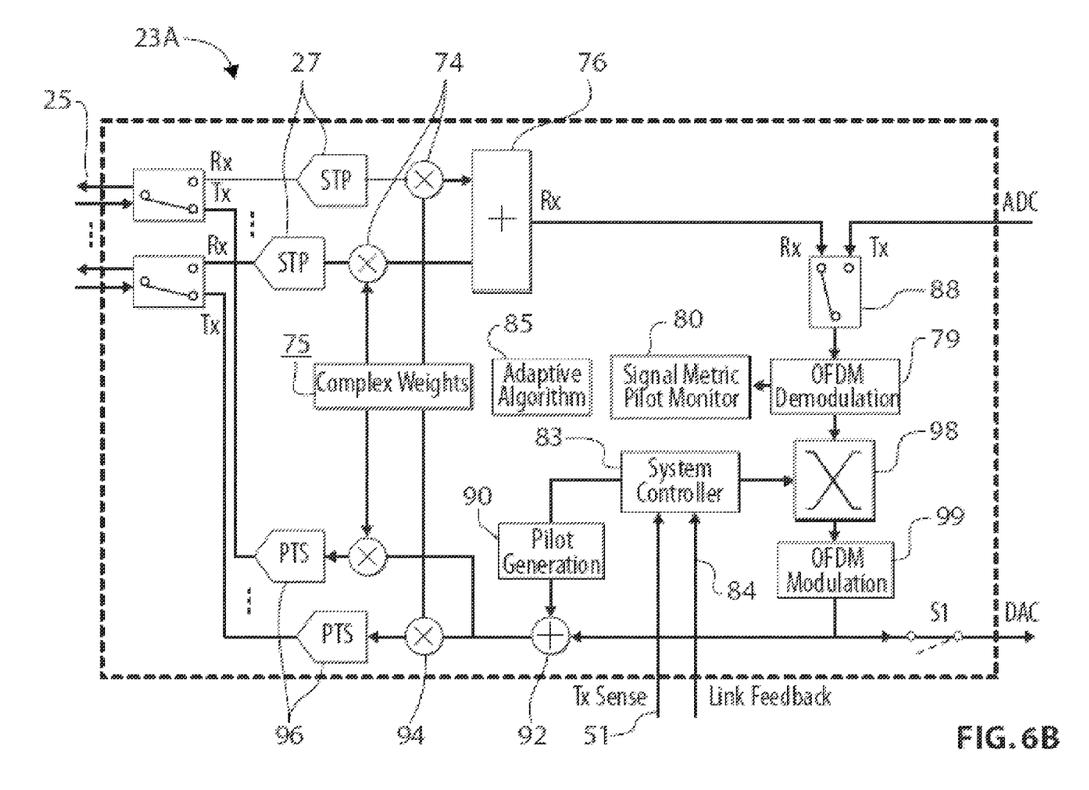

FIG. 6B shows schematically an example configuration for a digital signal processing architecture comprising logic 23A that provides for adaptive control over an antenna array and includes a multiplexer 98. FIGS. 6A and 6B share a number of similar functional elements which are identified by the same reference numerals in FIGS. 6A and 6B.

In transmit mode, signals received from ADC of digital radio module 50 are passed through switch 88 to OFDM demodulator 79. The demodulated signals are passed to multiplexer 98 and then to OFDM modulator 99. Multiplexer 98 may re-arrange data so that the data is assigned to different sub-carriers by OFDM modulator 99. The modulated data is passed to point 92 where it is combined with pilot signals from pilot signal generator 90 and then passed on to antennas by way of data links 25 as described above.

Any data to be transmitted by way of pilot signals may be passed to pilot signal generator 90 or, in the alternative, modulated onto the pilot sub-carriers by OFDM modulator 99. Where data is modulated onto a pilot sub-carrier by OFDM modulator 99, the generation of pilot signals for that pilot sub-carrier at pilot signal generator 90 may be suppressed.

When logic 23A is in receive mode, signals are received by way of data links 25 and carried through to combiner 76 as described above in relation to FIG. 6A. The received signals pass to OFDM demodulator 79 by way of switch 88. The demodulated signals are also passed to multiplexer 98 which undoes any rearrangement of data that may have occurred prior to transmission of the received signal. Information regarding how multiplexer 98 should be configured to rearrange the data may be transmitted on pilot signals. Such pilot signals may be identified in stage 80 and passed to system controller 83.

The received and rearranged signals are passed to OFDM modulator 99. In receive mode, switch S1 is closed, as shown in FIG. 6B so that the OFDM modulated output from OFDM modulator 99 is passed to the DAC of digital radio module 50.

The embodiment of FIG. 6B provides an adaptive algorithm 85 that operates as described above to set weights in memory 75.

The features discussed herein may be combined with one another and with other apparatus and systems in a wide range of ways. In one embodiment, a signal quality metric comprising at least one of an EVM and information regarding transmission of a pilot symbol is provided as a cost function to an adaptive algorithm for controlling an array of antennas. In addition, a quality measure for each sub-carrier is monitored. If the quality measure indicates that one or a few sub-carriers have poor transmission quality then data from the poor sub-carriers is re-allocated to unused sub-carriers. Control information regarding the reallocation is shared between endpoints of communication network 11. The control information may be provided by way of in-band signalling using one or more otherwise unused sub-carriers.

Also, a wide range of alternatives are possible in the practice of the invention. Some non-limiting example ways in which embodiments may be varied will now be described.

In some embodiments, communication is provided among more than two stations. In some embodiments a central station provides separate adaptive beam steering using one or more of the novel features described herein for two or more mobile terminals. Different beams (e.g. different sets of weighting factors) may be used for communicating with each mobile terminal. In some embodiments more than one fixed station may be provided.

In some embodiments, different users or sets of users use different pilot signals. For example, a base station may communicate with a first user using signals containing a first pilot signal and with a second user using a second pilot signal different from the first pilot signal. Both the first and second users can obtain a "priority" access to the shared spectrum.

As discussed above, embodiments of the invention may provide various advantages in certain applications. It is not mandatory that any or all of these advantages be provided. Some advantages possessed by some embodiments are described below.

A standard digital radio module may be applied to generate signals to be transmitted. The methods and apparatus as described herein can permit such off-the-shelf radios to operate with satisfactory performance in applications and environments where the radios would otherwise not perform well or at all. Embodiments as described herein can also be applied to retrofit added capabilities such as adaptive antenna operation, re-arrangement of data to OFDM sub-carriers, interference mitigation, etc. to existing radio systems. It is not mandatory that separate or standard radio modules be used in all embodiments.

Another advantage of some embodiments of the invention is that communication over long ranges, in excess of a few hundred meters is facilitated.

Another advantage of some embodiments of the invention is that longer-distance and higher throughput communication may be achieved in the presence of interference in an unlicensed portion of the spectrum.

The use of digital communications to interconnect antennas facilitates widely-spaced antennas which in turn facilitates more effective interference mitigation than could readily be achieved using more closely-spaced antennas. With the phase and amplitude of the received signals (i.e., the receive weights) captured at analog to digital converters at RF modules 24, transmit weights for steering the transmit beam in the direction of the received signal are easily calculated. Likewise, the effective path length differences between the analog (RF) sections of the receive and transmit chains can be compensated in a convenient way. With no analog RF signal interconnections between the antenna elements, both the variability between the interconnections, and losses in the beamformer are minimized.

Providing antenna elements each associated with a co-located RF module also facilitates convenient and wide spacing between antenna elements 22 and flexible deployment. The individual elements (or subarrays of multiple elements) of the array each comprise a separate physical entity or module. Wide spacing allows a radiation pattern having narrow lobes. This helps to mitigate interference from interference sources that are located closer to the desired signal than would be possible with conventionally-deployed antennas with smaller element spacing. The wide spacing also acts to better mitigate multiple interferers from widely spaced directions.

The ability to create a narrow high-gain radiation pattern facilitates point-to-point data communication over longer distances.

Certain implementations of the invention comprise computer processors which execute software instructions which cause the processors to perform a method of the invention. For example, one or more processors in a data communication system may implement methods as described herein by executing software instructions from a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. Accordingly, the scope of the invention is to be construed broadly as set out in the following claims. The invention includes, without limitation, the aspects described herein which may be applied individually, in combinations with one another, or in combination with other technologies.

What is claimed is:

1. A data transmission system comprising:
   an antenna system comprising one or more RF modules, each of the RF modules connected to one or more antenna elements, wherein
   the RF modules are connected to a processor by corresponding digital links;
   the system is configured to transmit and receive data on a plurality of sub-carriers in an OFDM scheme, the plurality of sub-carriers comprising one or more sub-carriers specified as being unused according to an OFDM protocol; and
   the system is configured to process a signal received at the antenna system to yield a modified receive signal by reassigning data from one or more of the unused sub-carriers of the receive signal to one or more corresponding other sub-carriers before processing the receive signal according to the OFDM protocol to extract received data from the modified receive signal;
   wherein the system is configured to extract from the received signal data identifying a correspondence between the one or more of the unused sub-carriers and the corresponding other sub-carriers.

2. A system according to claim 1 comprising an adaptive antenna processor configured to perform adaptive beamforming.

3. A system according to claim 1 comprising a plurality of the RF modules wherein the digital links connecting the RF modules to the processor comprise a plurality of separate wireless digital links.

4. A data transmission system comprising:
   an antenna system comprising one or more RF modules, each of the RF modules connected to one or more antenna elements, wherein
   the RF modules are connected to a processor by corresponding digital links;
   the system is configured to transmit and receive data on a plurality of sub-carriers in an OFDM scheme, the plurality of sub-carriers comprising one or more sub-carriers specified as being unused according to an OFDM protocol; and
   the system is configured to process a signal received at the antenna system to yield a modified receive signal by reassigning data from one or more of the unused sub-carriers of the receive signal to one or more corresponding other sub-carriers before processing the receive signal according to the OFDM protocol to extract received data from the modified receive signal
   wherein the RF modules each comprise a frequency synthesizer and are each connected to receive an RF carrier reference signal from the processor and to supply the RF carrier reference signal as an input signal to the frequency synthesizer.

5. A system according to claim 4 comprising a plurality of the RF modules wherein the digital links connecting the RF modules to the processor comprise a plurality of separate wireless digital links.

6. A data transmission system comprising:
   an antenna system comprising one or more RF modules, each of the RF modules connected to one or more antenna elements, wherein the RF modules are connected to a processor by corresponding digital links;
   the system is configured to transmit and receive data on a plurality of sub-carriers in an OFDM scheme, the plurality of sub-carriers comprising one or more sub-carriers specified as being unused according to an OFDM protocol; and
   the system is configured to process a signal received at the antenna system to yield a modified receive signal by reassigning data from one or more of the unused sub-carriers of the receive signal to one or more corresponding other sub-carriers before processing the receive signal according to the OFDM protocol to extract received data from the modified receive signal
   wherein the RF modules are configured to add a beacon signal to a transmitted signal on one or more of the unused sub-carriers in order to facilitate the adaptation of a smart antenna system receiving the transmitted signal.

7. A system according to claim 6 wherein the beacon signal is within a radio frequency bandwidth of the transmitted signal.

8. A system according to claim 6 comprising means for encoding information in the beacon signal the information comprising identification of one or both of best unused sub-carriers for data transmission and poorest sub-carriers for data transmission.

9. A system according to claim 6 wherein the beacon signal is modulated with data indicative of a power of beacon signals in the received signal.

10. A system according to claim 6 wherein the beacon signal is added using digital signal processing capability in the RF modules.

11. A system according to claim 6 comprising means for encoding information in the beacon signal the information comprising information indicative of quality of data transmission on some or all of the sub-carriers.

12. A system according to claim 6 comprising a plurality of the RF modules wherein the digital links connecting the RF modules to the processor comprise a plurality of separate wireless digital links.

13. A data communication system comprising:
   an antenna system comprising one or more RF modules, each of the RF modules connected to one or more antenna elements, and
   an adaptive antenna processor configured to perform adaptive beamforming;
   wherein: the RF modules are connected to a processor by corresponding digital links;
   the system is configured to transmit and receive data on a plurality of sub-carriers in an OFDM scheme, the plurality of sub-carriers comprising one or more sub-carriers specified as being unused according to an OFDM protocol; and
   the system is configured to process a signal received at the antenna system to yield a modified receive signal by reassigning data from one or more of the unused sub-carriers of the receive signal to one or more corresponding other sub-carriers before processing the receive signal according to the OFDM protocol to extract received data from the modified receive signal;
wherein the adaptive beamforming is performed in response to a cost function; and,
wherein the adaptive beamforming implements an optimal combining algorithm.

14. A system according to claim 13 wherein the RF modules are arranged to provide a classical pattern beamforming array.

15. A system according to claim 13 wherein the adaptive antenna processor is configured to control an antenna pattern by one or more of: selecting from among a plurality of configurations of the antenna elements having corresponding directional patterns; controlling amplitudes and/or phases of signals provided to and/or received at different ones of the antenna elements; selecting among different sub-sets of the antenna elements; altering positions orientations and/or configurations of one or more of the antenna elements.

16. A system according to claim 13 wherein the digital data links are wireless links.

17. A data communication system according to claim 13 wherein at least some processing for the adaptive beamforming is provided by the RF modules.

18. A system according to claim 13 wherein the cost function comprises a signal proportional to the strength of the received signal.

19. A system according to claim 13 comprising a plurality of the RF modules wherein the digital links connecting the RF modules to the processor comprise a plurality of separate wireless digital links.

20. A data communication system comprising:
an antenna system comprising one or more RF modules, each of the RF modules connected to one or more antenna elements, and
an adaptive antenna processor configured to perform adaptive beamforming;
wherein: the RF modules are connected to a processor by corresponding digital links;
the system is configured to transmit and receive data on a plurality of sub-carriers in an OFDM scheme, the plurality of sub-carriers comprising one or more sub-carriers specified as being unused according to an OFDM protocol; and
the system is configured to process a signal received at the antenna system to yield a modified receive signal by reassigning data from one or more of the unused sub-carriers of the receive signal to one or more corresponding other sub-carriers before processing the receive signal according to the OFDM protocol to extract received data from the modified receive signal;
wherein the adaptive beamforming is performed in response to a cost function; and,
wherein the cost function comprises a measure of one or more beacon signals appended to the received signal, or error vector magnitudes from the detection of OFDM symbols in the received signal, or a combination of these.

21. A system according to claim 20 comprising a plurality of the RF modules wherein the digital links connecting the RF modules to the processor comprise a plurality of separate wireless digital links.

22. A data communication system comprising:
an antenna system comprising one or more RF modules, each of the RF modules connected to one or more antenna elements, and
an adaptive antenna processor configured to perform adaptive beamforming;
wherein: the RF modules are connected to a processor by corresponding digital links;
the system is configured to transmit and receive data on a plurality of sub-carriers in an OFDM scheme, the plurality of sub-carriers comprising one or more sub-carriers specified as being unused according to an OFDM protocol; and
the system is configured to process a signal received at the antenna system to yield a modified receive signal by reassigning data from one or more of the unused sub-carriers of the receive signal to one or more corresponding other sub-carriers before processing the receive signal according to the OFDM protocol to extract received data from the modified receive signal;
wherein the adaptive beamforming is performed in response to a cost function; and,
wherein the cost function comprises a measure of one or more pilot signals carried on one or more of the unused sub-carriers.

23. A system according to claim 22 comprising a plurality of the RF modules wherein the digital links connecting the RF modules to the processor comprise a plurality of separate wireless digital links.

24. A data communication system comprising:
an antenna system comprising one or more RF modules, each of the RF modules connected to one or more antenna elements, and
an adaptive antenna processor configured to perform adaptive beamforming;
wherein: the RF modules are connected to a processor by corresponding digital links;
the system is configured to transmit and receive data on a plurality of sub-carriers in an OFDM scheme, the plurality of sub-carriers comprising one or more sub-carriers specified as being unused according to an OFDM protocol; and
the system is configured to process a signal received at the antenna system to yield a modified receive signal by reassigning data from one or more of the unused sub-carriers of the receive signal to one or more corresponding other sub-carriers before processing the receive signal according to the OFDM protocol to extract received data from the modified receive signal;
wherein the adaptive beamforming is performed in response to a cost function; and,
wherein the cost function comprises a measure of a beacon signal that is unique to a user such that signals which include a beacon signal of one user can be distinguished from other signals.

25. A system according to claim 24 comprising a plurality of the RF modules wherein the digital links connecting the RF modules to the processor comprise a plurality of separate wireless digital links.

26. A data communication system comprising:
an antenna system comprising one or more RF modules, each of the RF modules connected to one or more antenna elements, and
an adaptive antenna processor configured to perform adaptive beamforming;
wherein: the RF modules are connected to a processor by corresponding digital links;
the system is configured to transmit and receive data on a plurality of sub-carriers in an OFDM scheme, the plurality of sub-carriers comprising one or more sub-carriers specified as being unused according to an OFDM protocol; and the system is configured to process a signal received at the antenna system to yield a modified receive signal by reassigning data from one or more of the unused sub-carriers of the receive signal to one or more corresponding other sub-carriers before processing the receive signal according to the OFDM protocol to extract received data from the modified receive signal;

wherein the adaptive beamforming is performed in response to a cost function; and, wherein the cost function comprises a measure of a beacon signal and the beacon signal carries in-band control signals for antenna adaptation.

27. A system according to claim 26 comprising a plurality of the RF modules wherein the digital links connecting the RF modules to the processor comprise a plurality of separate wireless digital links.

28. A data transmission system comprising:
an antenna system comprising one or more RF modules, each of the RF modules connected to one or more antenna elements, wherein
the RF modules are connected to a processor by corresponding digital links;
the system is configured to transmit and receive data on a plurality of sub-carriers in an OFDM scheme, the plurality of sub-carriers comprising one or more sub-carriers specified as being unused according to an OFDM protocol; and
the system is configured to process a signal received at the antenna system to yield a modified receive signal by reassigning data from one or more of the unused sub-carriers of the receive signal to one or more corresponding other sub-carriers before processing the receive signal according to the OFDM protocol to extract received data from the modified receive signal;
wherein the system is configured to reassign data from one or more sub-carriers in a transmit signal to be transmitted by the antenna system to one or more corresponding ones of the unused sub-carriers in response to a quality measure for the one or more sub-carriers of the transmit signal.

29. A system according to claim 28 wherein the quality measure comprises one or more error vector magnitudes for OFDM symbols received on the sub-carrier.

30. A system according to claim 28 comprising a plurality of the RF modules wherein the digital links connecting the RF modules to the processor comprise a plurality of separate wireless digital links.

31. A data transmission system comprising:
an antenna system comprising one or more RF modules, each of the RF modules connected to one or more antenna elements, wherein
the RF modules are connected to a processor by corresponding digital links;
the system is configured to transmit and receive data on a plurality of sub-carriers in an OFDM scheme, the plurality of sub-carriers comprising one or more sub-carriers specified as being unused according to an OFDM protocol; and
the system is configured to process a signal received at the antenna system to yield a modified receive signal by reassigning data from one or more of the unused sub-carriers of the receive signal to one or more corresponding other sub-carriers before processing the receive signal according to the OFDM protocol to extract received data from the modified receive signal;
wherein the system is configured to share control information regarding the reassignment of data from sub-carriers to corresponding unused sub-carriers with endpoints of a communication network by way of in-band control signals.

32. A system according to claim 31 wherein the control information is transmitted on one or more of the unused sub-carriers.

33. A system according to claim 31 comprising a plurality of the RF modules wherein the digital links connecting the RF modules to the processor comprise a plurality of separate wireless digital links.

34. A data transmission system comprising:
an antenna system comprising one or more RF modules, each of the RF modules connected to one or more antenna elements, wherein
the RF modules are connected to a processor by corresponding digital links;
the system is configured to transmit and receive data on a plurality of sub-carriers in an OFDM scheme, the plurality of sub-carriers comprising one or more sub-carriers specified as being unused according to an OFDM protocol; and
the system is configured to process a signal received at the antenna system to yield a modified receive signal by reassigning data from one or more of the unused sub-carriers of the receive signal to one or more corresponding other sub-carriers before processing the receive signal according to the OFDM protocol to extract received data from the modified receive signal;
wherein the system is in data communication with an endpoint and the system is configured to independently determine a reassignment of data from one or more of the sub-carriers to corresponding ones of the unused sub-carriers based on information common to the system and the endpoint.

35. A system according to claim 34 comprising a plurality of the RF modules wherein the digital links connecting the RF modules to the processor comprise a plurality of separate wireless digital links.

* * * * *